United States Patent [19]

Shefler et al.

[11] 4,356,351

[45] Oct. 26, 1982

[54] DIGITAL MEMORY AUDIO PLAYBACK APPARATUS

[75] Inventors: Gerald E. Shefler; Ralph J. Weaver, III, both of Milwaukie, Oreg.

[73] Assignee: Ford Industries, Inc., Portland, Oreg.

[21] Appl. No.: 196,688

[22] Filed: Oct. 14, 1980

[51] Int. Cl.³ .............................................. H04M 1/64
[52] U.S. Cl. .................................. 179/1 B; 179/1 SM
[58] Field of Search ................... 179/1 B, 1 SM, 18 B, 179/6.06, 6.17, 6.18, 6.05

[56] References Cited

U.S. PATENT DOCUMENTS

| 3,641,496 | 2/1972 | Slavin | 179/1 SM X |
| 4,071,888 | 1/1978 | Owens | 179/1 B X |
| 4,255,618 | 3/1981 | Danner et al. | 179/1 B |
| 4,327,251 | 4/1982 | Fomenko et al. | 179/1 SM |

Primary Examiner—G. Z. Rubinson
Assistant Examiner—W. J. Brady
Attorney, Agent, or Firm—Kolisch, Hartwell & Dickinson

[57] ABSTRACT

Digital apparatus for storing and playing out a recorded announcement selectively over a plurality of telephone lines. The announcement is stored in a memory array, and for each telephone line there is an independently controllable pointer which tracks through the array to read out the announcement. With closely successively received telephone calls, playing out of the announcement over each line does not require the completion of such playing out over any other line.

4 Claims, 1 Drawing Figure

DIGITAL MEMORY AUDIO PLAYBACK APPARATUS

BACKGROUND AND SUMMARY OF THE INVENTION

This invention pertains to audio playback apparatus, and more particularly to such apparatus which employes a digital memory array to store audio information. For the purpose of illustration herein, the apparatus of the invention is described in the setting of an otherwise conventional telephone answering device, in which setting the invention has been found to have particular utility.

There are numerous circumstances, familiar to most people, where an incoming telephone call is greeted by a recorded announcement. For example, time-of-day and weather-report messages made available over the telephone system are routinely delivered in this manner. In addition, in recent past years there has been a mushrooming growth of private business and residential use of telephone answering devices to handle unattended telephone calls.

A problem which exists, in a circumstance where a particular telephone number, from which a message is to be delivered via an answering machine, receives heavy telephone traffic, is that there may be many calls which require attendance at substantially the same moment in time. In a telephone answering device which uses a single tape-transport mechanism bearing a single outgoing message tape, only one incoming call at a time can be handled—others having to wait, in turn, until each preceeding call receives a full playout of the recorded message. And, such a full playout necessarily requires a rewinding of the tape before the next playout can occur. In somewhat more sophisticated answering machines, multiple tapes are used—each bearing the same message, with such apparatus thus accommodating a higher density of telephone calls. The latter-mentioned kind of apparatus tends to be extremely complex and costly, and, naturally, presents a considerable maintenance problem.

A general object of the present invention is to provide a unique message storage and playback apparatus which takes care of the above-mentioned difficulties in an extremely practical and satisfactory manner.

More particularly, an object of the invention is to provide such apparatus which can handle an extremely high density of incoming telephone calls, with relatively simple and maintenance free construction. Indeed, the apparatus proposed by a preferred embodiment of the invention, has no moving parts at all.

Proposed, therefore, according to the invention is storage of an announcement in digitized form in a digital memory array. For each telephone line to which announcement playout is contemplated, the apparatus includes an independently controllable memory pointer which, when called upon, tracks through the array to "read out" the stored announcement. Instantly upon one pointer beginning to track through the array, another pointer, if called upon, can begin a tracking operation directly in the "wake" of the preceeding pointer.

Obviously, since the announcement is stored in a memory, there is no operation in the apparatus even remotely resembling magnetic tape rewinding.

Further, it will be apparent to those skilled in the art, that with apparatus constructed according to the invention, literally hundreds of telephone lines can be accommodated conveniently with an extremely simple announcement playback apparatus. Even with many hundreds of lines accommodated, no incoming caller will be delayed in receiving the full announcement, from the beginning for more than a mere fraction of a second.

These and other objects and advantages which are attained by the invention will become more fully apparent as the description which now follows is read in conjunction with the single drawing FIGURE which is a block/schematic diagram illustrating the apparatus of the invention coupled for use with a pair of telephone lines.

DETAILED DESCRIPTION OF THE INVENTION

Figure 1:
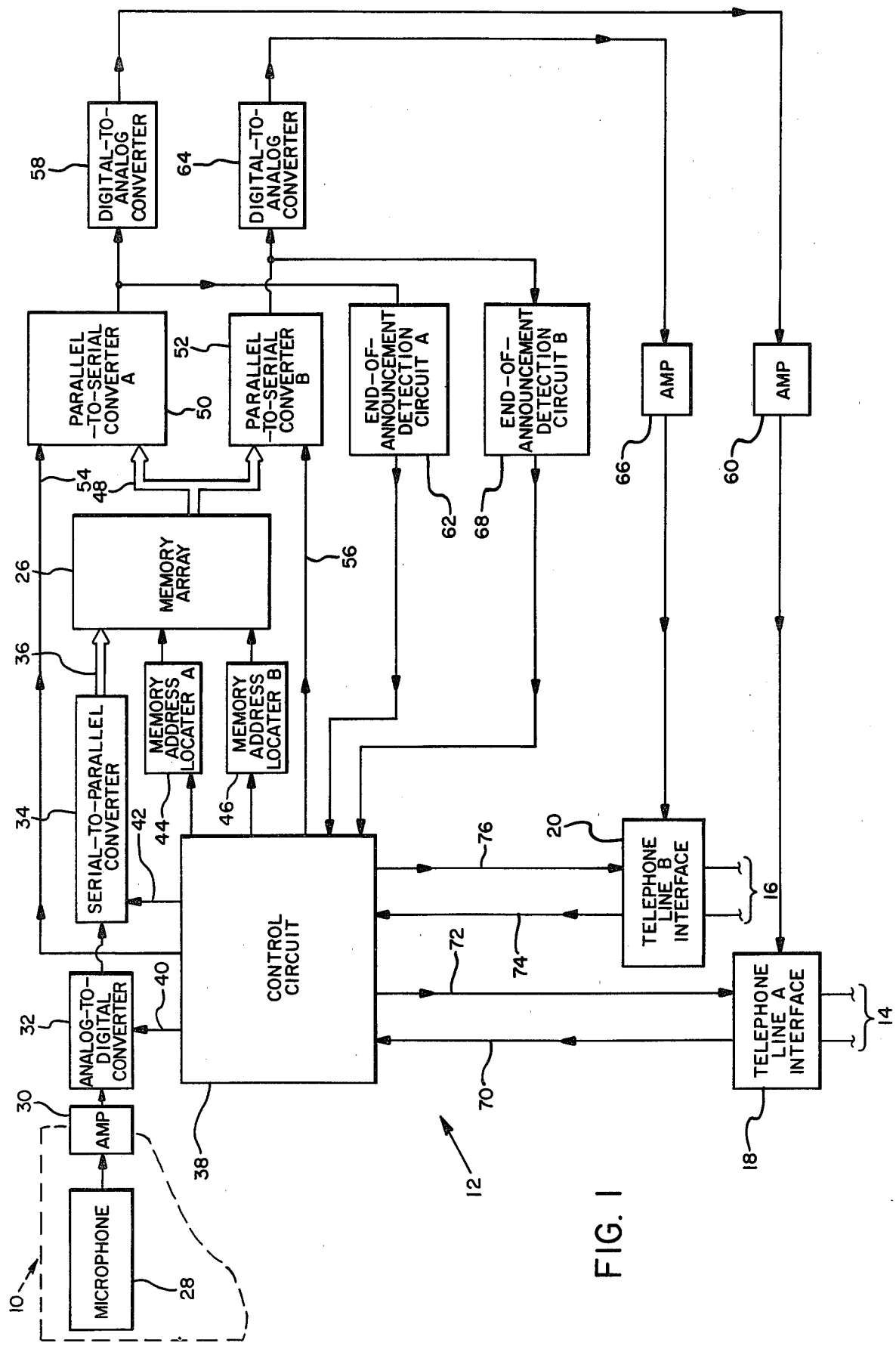

Turning now to the drawing, indicated fragmentarily and in dashed lines generally at 10 is a telephone answering device which, except as will be explained below with reference to the features of the invention, is in all other respects conventional in construction. Device 10 herein is generally of the type employed by small businesses to handle off-hours telephone inquiries.

Included in the answering device is announcement-recording and playout apparatus constructed according to the invention—this apparatus being indicated generally at 12 in the drawing. The main subelements of apparatus 12 are illustrated in labeled block form in the drawing, with each such element, taken alone, being conventional in construction. Unique in the apparatus is the cooperative coupling of these subelements to perform an announcement playout operation as outlined earlier.

While apparatus 12, as will be appreciated, is capable of handling many, many independent telephone lines, for the sake of simplicity herein, the same is shown set up to handle but a pair of such lines—shown at 14, 16. Lines 14, 16 are referred to hereinafter as line A and line B, respectively. These two telephone lines are coupled, for purposes which will shortly be explained, to conventional telephone line interface circuits 18, 20 which are of a type commonly employed with other kinds of telephone answering devices.

Forming what might be thought of as the core subelement in apparatus 12 is a digital memory array 26. This array is constructed to receive digitized audio data, and to store the same with a storage capacity of up to about 30-seconds. The size of the array's storage capacity is, of course, simply a matter of choice. As should be apparent, it is intended that array 26, when it is in operative condition, store for playback a common announcement which is to be played out to all parties calling in on lines A and B. In fact, array 26, as it is displayed in the drawing, contains such an announcement.

Explaining briefly the structure which enables recording and changing of an announcement, at 28 is a microphone which couples through an audio amplifier 30 to an analog-to-digital converter 32. The output of converter 32 couples through a serial-to-parallel converter 34 and through a data bus 36 to the data input in array 26.

Indicated at 38 in the drawing is what is referred to herein as a control circuit. Circuit 38 performs a number of functions which will be explained. There are numerous conventional ways in which to construct a circuit like circuit 38, well known to those skilled in the art, and accordingly, details of this circuit, which form no part of the present invention, are omitted.

One of the functions performed by circuit 38 is the provision of "clock" pulses for operating several subelements in apparatus 12. Thus, clock pulses are supplied via a conductor 40 to converter 32, and via a conductor 42 to converter 34. With the apparatus placed (in any conventional manner) in a condition to record an announcement in array 26, control circuit 38 supplies clock pulses to converters 32, 34, and a message spoken in over microphone 28 is supplied in a well known manner, via bus 36, to the array. Successive bytes of data are stored, also in a well understood manner, at designated addresses located within the array. Nothing regarding the recording of an announcement forms any part of the present invention.

Interposed as shown between control circuit 38 and array 26 are two memory address locators, or pointers, designated Memory Address Locator A and Memory Address Locator B. These locators, which obviously are associated, respectively, with telephone lines A and B, are represented in block form at 44, 46, respectively. On the output side of array 26, a data bus 48 connects the array to the data inputs in two parallel-to-serial converters 50, 52 which are associated with lines A, B, respectively. Clock pulses for operating converters 50, 52 are supplied from control circuit 38 via conductors 54, 56, respectively.

The output of converter 50 is connected through a digital-to-analog converter 58 and an audio amplifier 60 to an audio input in telephone line interface 14. Also, the output of converter 50 is connected to the input of what is referred to as an end-of-announcement detection circuit A—represented by block 62. The output of this detection circuit is connected to a control input in control circuit 38. Converters 50, 58 constitute collectively an enabling means herein.

Similarly, the output of converter 52 is connected through a digital-to-analog converter 64 and an audio amplifier 66 to an audio input in telephone line interface 20. Further, the output of converter 52 is connected to the input of a detection circuit 68, which is like previously mentioned detection circuit 62. The output of detection circuit 68 is connected to another control input in control circuit 38. Converters 52, 64 together constitute an enabling means herein.

Finally, connecting interface 18 and circuit 38 are two conductors 70, 72. Connecting interface 20 and circuit 38 are two conductors 74, 76.

Explaining now how the apparatus of the invention performs, and assuming that the same is set in a condition to await incoming calls over lines A and B, with an announcement stored in array 26, let us assume further that a first telephone call arrives on line A. The arrival of this call is sensed by interface 18 which sends a control pulse via conductor 70 to control circuit 38. Interface 18 also places apparatus 12 with respect to line A in what is known as an off-hook or answered condition.

Receipt of the control pulse just mentioned by circuit 38 causes the control circuit to feed clock pulses to operate memory address locator 44. With operation of this locator, it sends to the array what might be thought of as data extraction signals which track serially through the memory array in the same order that the announcement data was stored in the array. Simultaneously it feeds clock pulses to converter 50 which receives a train of data bytes via bus 48. Converter 50 in turn feeds to converter 58 a series of stream of data bytes derived from the train of bytes. Converter 58 converts this stream into an analog audio signal which is amplified by amplifier 60 and coupled through interface 18 to line A. Thus, the calling party on line A begins substantially instantaneously to hear a playback of the recorded announcement.

At the end of the announcement for line A, this is sensed by detection circuit 62, which then sends a control pulse to control circuit 38—ending that part of the control operation of circuit 38 which relates to playing out of a message over line A. In particular, circuit 38 sends over conductor 72 a control signal to interface 18 causing the interface to break the connection with line A.

Explaining further the operation of apparatus 12, let us assume that just fractions of a second after a call is received on line A, one is also received on line B. Interface 20 operates with line B in substantially the same manner as interface 18 operates with line A. Thus, circuit 38 is informed via a suitable control pulse over conductor 74 that a call on line B has been received, and the control circuit begins immediately to feed clock pulses to locator 46 and to converter 52. Locator 46 operates totally independently of locator 44, with neither in any way interferring with the operation of the other. Thus, locator 46 begins immediately tracking through the array to extract exactly the same data which is also being extracted by locator 44, except that locator 46 is "moving" always at a different location in the array than locator 44. Data extracted by operation of locator 46 is fed via bus 48 to converter 52 which feeds a stream of binary data bits to digital-to-analog converter 64. This converter, like converter 58, converts the binary stream to an audio signal, and this signal is amplified by amplifier 66 and coupled through interface 20 to telephone line B. Thus, the caller on line B hears a playback of the announcement, simultaneously with the caller on line A. Naturally, the information now being received by a caller on line A is just slightly in advance of the information being received by the caller on line B.

Termination of playing out of an announcement over line B is handled in substantially the same manner as that described for conclusion of playing out of an announcement to line A. Detection circuit 68 notes the end of the announcement, and sends a control pulse to circuit 38 which, in turn, sends a control pulse over conductor 76 to interface 20 causing the latter to break the connection with line B.

It should thus be apparent how the apparatus of the invention meets the objectives, and offers all of the advantages, ascribed to it earlier herein. It should also be appreciated how the proposed apparatus is capable of handling extremely large numbers of telephone lines.

As was mentioned earlier, the invention has been described herein particularly in the setting of a telephone system. A reason for this is that such a system offers a wide range of immediate applications.

Other kinds of systems, however, may equally well employ the invention. For example, large hospitals may have a plurality of station-dispursed diagnostic machines, such as x-ray machines, all of which may communicate with a central computer. When a user proposes to use a particular machine, the procedure may call for the computer, first, to transmit verbal instructions to the user. In such a setting, applicants' invention obviously will speed the transmissions of instructions to several users simultaneously. Thus use of the phrase "or the like" herein is reference to telephone equipment is meant to recognize utility of the invention in many other fields.

While a preferred embodiment of the invention has been shown and described herein, it is appreciated that variations and modifications may be made without departing from the spirit of the invention.

It is claimed and desired to secure as Letters Patent:

1. Apparatus usable with a telephone answering device or the like for enabling the playing out of a common recorded announcement to a plurality of telephone lines which are operatively connected to the device, said apparatus comprising a digital memory array constructed to receive and store an announcement in digital form, for each telephone line, an associated pointer operatively connected to said array, each pointer being operable, on command, to track through the array, independent of each other pointer, and regardless of the current operating condition of any other pointer, to read out the announcement, and means for each telephone line operatively connected to said array for enabling audio coupling to the line of an announcement read out by the associated pointer.

2. The apparatus of claim 1, wherein said enabling means includes a parallel-to-serial converter operatively connected to said array, and a digital-to-analog converter operatively interposed between said converter and the associated telephone line.

3. In combination with a plurality of telephone lines, and a telephone answering device or the like, apparatus enabling the playing out from such a device to such lines of a common recorded message, said apparatus comprising a digital memory array constructed to receive and store an announcement in digitized form, for each of said telephone lines, an associated pointer operatively connected to said array, each pointer being operable, on command, to track through the array, independent of each other pointer, and regardless of the current operating condition of any other pointer, to read out the announcement, and means for each of said telephone lines operatively connected to said array for enabling audio coupling to the line of an announcement read out by the associated pointer.

4. The apparatus of claim 3, wherein said enabling means includes a parallel-to-serial converter operatively connected to said array, and a digital-to-analog converter operatively interposed between said converter and the associated telephone line.

* * * * *